United States Patent Office 3,341,335
Patented Sept. 12, 1967

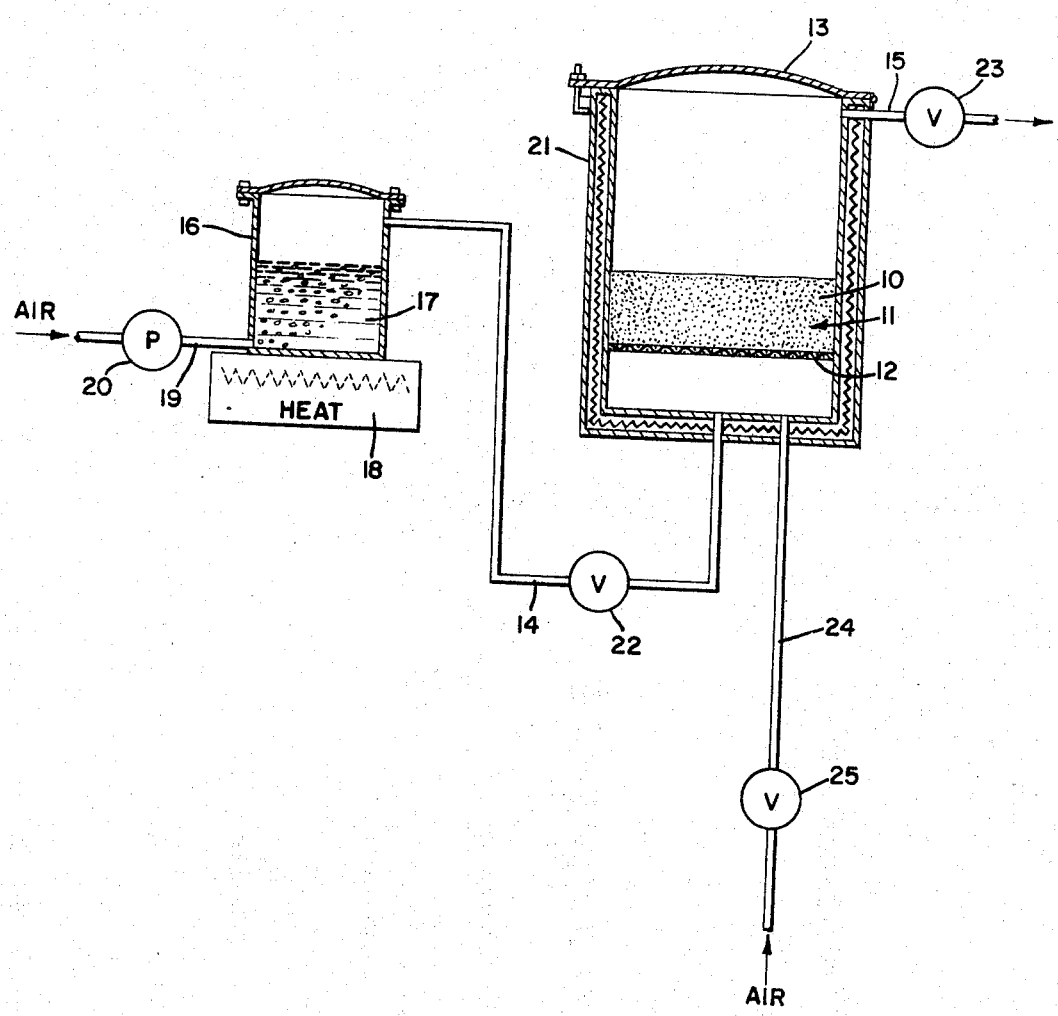

3,341,335
METHOD OF STERILIZING DRY PARTICULATE MATERIAL
Dave Eolkin, Pacifica, Calif., and Robert J. Bouthilet, Western Springs, Ill., assignors of one-half to Norda Essential Oil and Chemical Co., New York, N.Y.
Filed Apr. 1, 1963, Ser. No. 269,392
11 Claims. (Cl. 99—150)

This invention relates to sterilization. More particularly it relates to the sterilization of a dry particulate material such as a food product by contacting the material with a particular gas phase bactericide and carrier.

In a preferred embodiment the present invention provides a method for sterilizing a dry particulate food comprising vaporizing a hydrocarbon diester of pyrocarbonic acid by heating the diester. The vaporized diester is combined with a gaseous carrier such as air. The combined vaporized ester and gaseous carrier is then permeated through the dry food to be sterilized sufficiently to sterilize the same.

The accompanying drawing shows schematically apparatus for practicing the present invention.

As noted, the particular chemical here used for killing micro-organisms is a hydrocarbon diester of pyrocarbonic acid. This material may be represented by the general formula:

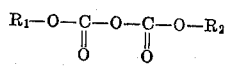

wherein $R_1$ and $R_2$ represent the same or different hydrocarbon radicals. For example, $R_1$ and $R_2$ may be and preferably are alkyl radicals such as methyl, ethyl, propyl, butyl, isopropyl, amyl, or isoamly radicals. Suitably, $R_1$ and $R_2$ may be cycloalkyl radicals such as the cyclohexyl radical. Alternatively, $R_1$ and $R_2$ may be an aryl or aralkyl radical such as phenyl or benzyl, or a heterocyclic radical such as the furfuryl radical. Any of the above exemplary hydrocarbon radicals may be substituted, for example by halogen. The preferred material for the present invention is the diethyl ester wherein $R_1$ and $R_2$ are both ethyl radicals.

Pyrocarbonic acid esters of the foregoing type have heretofore been employed in the preservation of foodstuffs by combining a suitable amount of the ester with the food to be preserved. In all cases the ester was added to the food in a fluid or slurry medium and usually in the presence of a considerable amount of water. The reason for this was two-fold. First, the above described esters at room temperature and pressure comprise liquids and solids. Thus in order to obtain a thorough dispersion of the preservative in the food in the relatively small quantities used, a liquid or slurry medium was necessary. Secondly, the above type esters are employed because they react in the presence of water and are converted to end products including $CO_2$ and alcohols. Consequently, the esters were employed with aqueous slurries in order to take advantage of this property. In doing so, relatively large quantities of moisture were used.

The present invention is designed to take advantage of the unique and desirable properties of this group of pyrocarbonic acid esters in relation to their ability to react and yield nontoxic end products (and therefore the food is not permanently preserved and may be fermented during digestion, for example). At the same time the invention provides a way to accomplish the preservation of the food without the presence of the large quantities of moisture heretofore utilized. Consequently, it permits the preservation of dry particulate materials such as foods and including items such as nuts, spices, cereal grains, cereal flours, prepared food mixes, starches, dry vegetables, dry juices, cake mixes, dry egg, protein products, and the like. An example of a non-food item which may be similarly treated is tobacco.

It will be appreciated that dry materials such as the above are not suitably combined with a large amount of water, for example, for purposes of sterilization or significant problems in redrying, caking, and like changes in texture and form would be introduced. In accordance with the present invention it has been found that if the selected ester is vaporized by a procedure such as that described hereinafter and contacted with the food in gaseous form in combination with a suitable carrier, the desired sterility will be obtained without introducing the problems present where liquid media such as water are employed. It has been found that the decomposition of the ester is achieved as in previous procedures by the normally occurring small amounts of moisture that are present in commercially "dry" materials. As understood by those skilled in the art, materials that are normally referred to as dry of the type here involved usually contain several percent moisture, i.e. on the order of about 5% but variable depending on the material and other conditions. It has been found that this moisture is sufficient to react with the ester to convert it to the nontoxic end products. Alternatively, or in addition to the previously used means of disposing of the preservative, i.e. reaction to form nontoxic end products, other means may be employed to remove the preservative after it has performed its function.

The accompanying drawing illustrates schematically apparatus suitable for practicing the present process.

Turning to the accompanying drawing, a dry particulate substance 10 to be sterilized is placed in a treatment chamber 11. Treatment chamber 11 is adapted for fluidizing materials 10 and contains a porous plate 12 upon which materials 10 rest. Treatment chamber 11 includes a removable cover 13 for filling and emptying treatment chamber 11.

Associated with treatment chamber 11 are inlet conduit 14 and outlet conduit 15. Inlet conduit 14 links the area below plate 12 into fluid communication with vaporizing chamber 16. A selected hydrocarbon ester of pyrocarbonic acid 17 is placed in vaporizing chamber 16. A heater 18 is associated with vaporizing chamber 16 for raising the temperature of ester 17 as desired. A conduit 19 and pump 20 communicate interiorly with vaporizing chamber 16 adjacent the bottom thereof. The carrier gas employed enters chamber 16 through conduit 19 under impetus from pump 20.

As an example of operation, black pepper may be used as material 10. Ester 17 is suitably the diethyl ester of pyrocarbonic acid. It is a liquid at room temperature and pressure. A suitable carrier gas is air (although another gas could equally well have been used such as nitrogen). The air is forced into chamber 16 beneath the surface of ester 17 by pump 20 and is allowed to bubble upwardly through ester 17. Suitably, pump 20 is actuated so as to create a generally very slow rate of bubbling. At the same time heater 18 is actuated sufficiently to raise the temperature of ester 17 to about 30–50° C. While ester 17 at room temperature and pressure has a very low vapor pressure under the influence of the elevated temperature and the passage of carrier gas therethrough, a sufficient amount of ester 17 is vaporized and carried through conduit 14 and upwardly through plate 12 into contact with the pepper 10 thereabove. The process is continued for a time sufficient to sterilize the black pepper. While the time will vary depending upon the temperature created by heater 18 and the rate of air flow, sterilization may be obtained in times on the order of about 15 minutes. (A control sample of black pepper that was not sterilized in this manner had a micro-organism count of 160.)

Sterilization is obtained by the absorption of the ester vapor by material 10 as the gas flow proceeds through chamber 11. During this phase of the process, the material 10 is not moistened by the gas and the particulate nature of the material is retained. To ensure drying and absence of liquid condensation of the ester vapor, it is advantageous to maintain chamber 11 at an elevated temperature with heater jacket 21. If jacket 21 is utilized, it is suitably adjusted to bring the temperature in chamber 11 near that of the vaporization chamber 16.

Vaporization of the ester 17 in chamber 16 may in some cases be accelerated by applying a negative pressure to the system. In this event instead of utilizing a pump 20 for flowing the carrier gas and vaporized ester through the component parts, a source of vacuum (not shown) can be applied at conduit 15. This will serve to create the desired flow of carrier gas and vapor through the lines and will also accelerate the vaporization process. In this alternative heat may be beneficially used as before.

The precise amount of ester needed with respect to the materials 10 under treatment is variable over a considerable range. It has been discovered, however, that when the present dry vapor sterilization treatment is employed in contrast with the liquid phase sterilization previously used, the amount of ester required for sterilization is significantly reduced. Thus it has been discovered that where the ester vapor (by weight) absorbed by the material is between .000001–.001%, sterilization is obtained.

After sterilization has been accomplished, the residual absorbed ester may be disposed of by a number of suitable alternatives as desired. As before the ester (in the absorbed vapor phase) may be permitted to remain in the material sterilized to react with the moisture present even in "dry" material to produce carbon dioxide and alcohol. As one alternative, or in addition to such degradation of the ester, the residual ester may be removed by applying a negative pressure to chamber 11 through conduit 15. To accomplish this a valve 22 in conduit 14 is suitably closed and valve 23 in conduit 15 is suitably opened while conduit 15 is connected to a vacuum source (not shown). Another alternative would be to close valve 22, open valve 23 and inject a flow of a pure gas without ester and flow it through chamber 11 and thereby carry away the residual ester. To accomplish this a conduit 24 with a valve 25 may be suitably employed. The valve 25 is opened and a flow of air, for example, moved into chamber 11 through materials 10 and out through conduit 15.

The present process is also suitably employed utilizing conventional gas sterilization techniques that do not use fluidized bed concepts as above described. Thus, if valves 22 and 25 are closed and valve 23 opened, conduit 15 may suitably be linked to a source of vacuum and a vacuum created in chamber 11. At that time valve 23 may be closed and valve 22 opened while a carrier gas such as air is permitted to pass through ester 17 and with the vapor obtained therefrom, flow through conduit 14 into chamber 11 to release the vacuum. (Pump 20 need not be operated for this purpose.) Valve 22 is then suitably closed and the gas permitted to remain in chamber 11 until the sterilization is complete. Valves 23 and 25 may then be opened and the residual ester vapor flushed out with a pure flow of air.

Although the foregoing invention has been described in some detail by way of illustration and example for purposes of clarity of understanding, it is understood that certain changes and modifications may be practiced within the spirit of the invention as limited only by the scope of the appended claims.

What is claimed is:
1. A method for sterilizing a water-containing commerically dry particulate material comprising establishing a flow of carrier gas and a vaporized hydrocarbon diester of pyrocarbonic acid, and contacting said material sufficiently with said flow so that said material absorbs about .000001–.001% by weight of said diester to sterilize the material while maintaining said diester in the vapor state, and after sterilization has been completed, permitting the residual diester to remain on the material to react with water content of the dry material to decompose the diester into products including carbon dioxide and alcohol.

2. A method in accordance with claim 1 wherein the ester absorbed by said food is decomposed, after sterilization of the food, into carbon dioxide and ethyl alcohol with moisture present in the food.

3. A method for sterilizing a water-containing commercially dry particulate food comprising vaporizing a hydrocarbon diester of pyrocarbonic acid, combining said vapor with a gaseous carrier, and permeating said dry particulate food with said vapor and gaseous carrier so that said food absorbs .000001–.001% by weight of said diester sufficiently to sterilize the same while maintaining said diester in the vapor state, and after sterilization has been completed, permitting the residual diester to remain on the food to react with water content of the dry food to decompose the diester into products including carbon dioxide and alcohol.

4. A method in accordance with claim 3 wherein said diester is a diethyl ester.

5. A method in accordance with claim 3 wherein said gaseous carrier is air.

6. A method in accordance with claim 3 wherein said diester is vaporized by heating the ester while applying negative pressure thereto.

7. A method in accordance with claim 3 and including the step of removing the ester absorbed by said food after the food has been sterilized by the application of negative pressure to said food.

8. A method in accordance with claim 3 and including the step of removing the ester absorbed by said food after the food has been sterilized by flowing a heated gas through the food.

9. The method in accordance with claim 3 wherein said diester is the diethyl ester of pyrocarbonic acid and it is vaporized by heating to a temperature between about 30–50° C.

10. The method in accordance with claim 3 wherein air is the gaseous carrier and the air is bubbled through said diester while heating said diester to a temperature between 30–50° C., then flowing the air that has been bubbled through said diester in contact with said food.

11. In the method for preserving water-containing commercially dry foods by the incorporation of a diester of pyrocarbonic acid therein, the improvement comprising vaporizing said diester, combining the vaporized diester with a gaseous carrier, evacuating the atmosphere about the food to be preserved, then surrounding the food with said vaporized diester and gaseous carrier for a sufficient time so that said food absorbs .000001–.001% by weight of said diester to sterilize the feed while maintaining said diester in the vapor state, and then removing the vaporized diester and carrier from contact with the sterile food and replacing it with air, permitting the residual diester to remain on the food to react with the water content of the dry food to decompose the diester into products including carbon dioxide and alcohol.

References Cited
UNITED STATES PATENTS

| | | | |
|---|---|---|---|
| 124,161 | 2/1872 | Rocke | 99—150 X |
| 2,181,177 | 11/1939 | Davis | 99—224 X |
| 2,370,768 | 3/1945 | Baerwald | 99—225 X |
| 2,910,400 | 10/1959 | Bernhard et al. | 99—224 X |
| 3,198,636 | 8/1965 | Bouthilet | 99—224 X |

HYMAN LORD, *Primary Examiner.*

A. LOUIS MONACELL, *Examiner.*